United States Patent
Hoffmann et al.

(10) Patent No.: US 9,674,111 B2
(45) Date of Patent: Jun. 6, 2017

(54) CONTROL MECHANISM FOR RELIABILITY AND AVAILABILITY SETTING IN VIRTUAL NETWORKS

(75) Inventors: Klaus Hoffmann, Munich (DE); Marco Hoffmann, Munich (DE)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 595 days.

(21) Appl. No.: 13/882,237

(22) PCT Filed: Oct. 29, 2010

(86) PCT No.: PCT/EP2010/066539
§ 371 (c)(1),
(2), (4) Date: Apr. 29, 2013

(87) PCT Pub. No.: WO2012/055448
PCT Pub. Date: May 3, 2012

(65) Prior Publication Data
US 2013/0212285 A1    Aug. 15, 2013

(51) Int. Cl.
*G06F 15/173* (2006.01)
*H04L 12/927* (2013.01)
(Continued)

(52) U.S. Cl.
CPC ........ *H04L 47/805* (2013.01); *H04L 12/4641* (2013.01); *H04L 41/0893* (2013.01)

(58) Field of Classification Search
CPC . H04L 12/4641; H04L 47/805; G06F 15/173; G06F 11/008
(Continued)

(56) References Cited

U.S. PATENT DOCUMENTS 7,545,829 B2    6/2009  Shimazaki et al.
8,990,397 B2 *  3/2015  Yeow et al. .................. 709/226
(Continued)

FOREIGN PATENT DOCUMENTS

CN    1509022 A    6/2004
CN    1685758 A    10/2005
(Continued)

OTHER PUBLICATIONS

Introduction and Overview of the 4Ward Technical Results by Henrick Abramowicz starting date Aug. 1, 2001; The network of the future; project 216041.*
(Continued)

*Primary Examiner* — Frantz Jean
(74) *Attorney, Agent, or Firm* — Laurence A. Greenberg; Werner H. Stemer; Ralph E. Locher

(57) ABSTRACT

A mechanism for improving a reliability of a virtual network and resources used. At a virtual network operator level, a request for providing resources for the virtual network is sent towards an infrastructure provider level. The request includes an indication regarding a required availability and reliability level which is to be achieved by the resources of the virtual network. At an infrastructure provider level the request is processed in order to determine the required availability and reliability level, and it is checked whether the required availability and reliability level is achievable for the resources to be provided for the virtual network. A result (confirmation or denial) of the check is sent back to the virtual network operator level.

17 Claims, 7 Drawing Sheets

(51) Int. Cl.
*H04L 12/46* (2006.01)
*H04L 12/24* (2006.01)

(58) Field of Classification Search
USPC .................. 709/226, 203; 714/1-4, E11.02; 717/124
See application file for complete search history.

(56) References Cited

U.S. PATENT DOCUMENTS

| | | | | |
|---|---|---|---|---|
| 2004/0230858 | A1* | 11/2004 | Susskind | G06F 11/008 714/1 |
| 2004/0230953 | A1* | 11/2004 | Garzia | G06F 11/008 717/124 |
| 2005/0260997 | A1 | 11/2005 | Korale et al. | |
| 2010/0077395 | A1* | 3/2010 | Edwards | H04L 12/66 718/1 |
| 2011/0029675 | A1* | 2/2011 | Yeow | G06F 11/2041 709/226 |
| 2011/0246647 | A1 | 10/2011 | Marquezan et al. | |
| 2012/0233302 | A1* | 9/2012 | Kallin | H04L 41/5025 709/221 |

FOREIGN PATENT DOCUMENTS

| | | |
|---|---|---|
| CN | 101060693 A | 10/2007 |
| WO | 2010066430 A1 | 6/2010 |

OTHER PUBLICATIONS

Abramowicz, H., et al., "Introduction and Overview of the 4WARD Technical Results"; Jun. 30, 2010; XP002621653, Retrieved from the Internet: URL:http://www.4ward-project.eu/index.php?s=Deliverables.

Bo, L., et al., "A Hierarchical Virtual Resource Management Architecture for Network Virtualization"; WICOM, 2010 6th International Conference on IEEE; Sep. 23, 2010; pp. 1-4; XP031775324.

Chowdhury, N., et al., "Network virtualization: state of the art and research challenges"; vol. 47, No. 7; Jul. 1, 2009; pp. 20-26; XP011282131; DOI:10.1109/MCOM.2009.5183468.

"Open Flow Switch Specification"; Version 1 .0.0 (Wire Protocol 0x01); Dec. 31, 2009.

Braden, R., et al., "Resource ReSerVation Protocol (RSVP)"; Version 1 Functional Specification; Sep. 6, 1997; IETF; RFC2205.

Awduche, D., et al., "RSVP-TE: Extensions to RSVP for LSP Tunnels"; RFC 3209; IETF; Dec. 2001.

Berger, L., "Generalized Multi-Protocol Label Switching (GMPLS) Signaling Resource Reservation Protocol-Traffic Engineering (RSVP-TE) Extensions", Jan. 2003, pp. 1-43.

Li, T., et al., "IS-IS Extensions for Traffic Engineering", Oct. 2008, rfc5305, IETF.

Bless, R., et al., "Network Virtualization from a Signaling Perspective"; Future-Net '09 10 International Workshop on the Network of the Future 2009 in conjunction with IEEE ICC 2009; Dresden, Germany; Jun. 16-18, 2009.

Papadimitriou, P. et al., "Implementing Network Virtualization for a Future Internet"; 20th ITC Specialist Seminar on Network Virtualization; Hoi An, Vietnam; May 2008.

Yasukawa, S., "Signaling Requirements for Point-to-Multipoint; Traffic-Engineered MPLS Label Switched Paths (LSPs)" Network Working Group memo; Apr. 2006.

Farrel, A., et al., "A Path Computation Element (PCE)—Based Architecture", Network Working Group, memo, Aug. 2006, IETF Standard; Internet Engineering Task Force, IETF, CH; XP015047407.

Ash, J., et al., "Path Computation Element (PCE) Communication Protocol Generic Requirements", IEEE, Sep. 2006; RFC4657.

Doria, A., et al., "Forwarding and Control Element Separation (ForCES) Protocol Specification"; Mar. 2010; RFC581 0.

* cited by examiner

CONTROL MECHANISM FOR RELIABILITY AND AVAILABILITY SETTING IN VIRTUAL NETWORKS

BACKGROUND OF THE INVENTION

Field of the Invention

The present invention relates to network virtualization. In particular, the present invention relates to a method, apparatus, system and computer program product providing a mechanism for improving creation/modification processes for a virtual network in order to ensure reliability of the virtual network and resources used therein.

Related Background Art

Prior art which is related to this technical field can e.g. be found in "Network Virtualization from a Signaling Perspective" by Roland Bless and Christoph Werle, Future-Net '09 International Workshop on the Network of the Future 2009 in conjunction with IEEE ICC 2009, Dresden, Jun. 16-18, 2009, "Implementing Network Virtualization for a Future Internet" by P. Papadimitriou, O. Maennel, A. Greenhalgh, A. Feldmann, and L. Mathy, 20th ITC Specialist Seminar on Network Virtualization, Hoi An, Vietnam, May 2008, as well as Request For Comments (RFC) Nos. 4461, 4655, 4657, 5305, 5810 issued by the IETF.

The following meanings for the abbreviations used in this specification apply:

CAA—conjunction allowed active
CAP—conjunction allowed passive
ERO—explicit route object
FORCES—forwarding and control element separation
IP—Internet protocol
NE—network element
PCE—path computation element
PCEP—path computation element protocol
PIP/InP—physical infrastructure provider/infrastructure provider
POP—point of presence
QoS—quality of service
RRO—record route object
RSVP—resource reservation protocol
SERO—subsequent explicit route object
SLRG—shared risk link group
SRRO—subsequent record route object
VNO—virtual network operator
VNP—virtual network provider
VR—virtual resource In the last years, an increasing extension of communication networks, e.g. of wire based communication networks, such as the Integrated Services Digital Network (ISDN), broadband networks, and especially the Internet and other packet based networks based e.g. on the Internet Protocol (IP), Ethernet, MPLS/GMPLS (Multiprotocol Label Switching/Generalized Multiprotocol Label Switching) or related technologies and preferably using optical transmission based on SDH/SONET (Synchronous Digital Hierarchy/Synchronous Optical Networking) and/or WDM/DWDM (Wavelength Division Multiplexing/Dense Wavelength Division Multiplexing), or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Recent technology progress deals with network virtualization, which splits the conventional monolithically owned, used and operated networks into subsets to be used, operated and managed by different, organizationally independent control entities or organizations. Basically, network virtualization is a concept to create logical network resources, e.g. virtual nodes and virtual links, which form a virtual network, from physical resources.

The use of network virtualization promises additional flexibility and offers opportunities for deploying future network architectures. That is, network virtualization enables for the creation of logically isolated network partitions over a shared physical network infrastructure, wherein the network virtualization can be driven by the needs in, for example, an enterprise domain. Furthermore, network virtualization covers network elements and protocols that together maintain a coherent end-to-end view of a virtual network.

Basically, network virtualization is considered in 3 main sections:

Network elements: how is traffic separation and isolation of different virtual networks maintained internal to a network element for the data part and the control part;

Data path: how is traffic separation enforced across a network path;

Control plane: what extensions to protocols are needed to control and manage partitioned resources (access to NEs and between NEs).

Considerations regarding network virtualization are made, for example, in connection with several projects, for example 4WARD (European-Union funded) and G-Lab (German national funded). Results of such projects introduced, for example, a separation into different roles regarding network virtualization, i.e. a Virtual Network Operator, VNO, role or level, a Virtual Network Provider, VNP, role or level, and a Physical Infrastructure Provider or just Infrastructure Provider, PIP/InP, role or level.

PIP/InP are infrastructure providers, e.g. large companies that own the infrastructure required to enable communication between different locations and which provide end users with access to their networks. Infrastructure providers may also enable the creation of virtual nodes and virtual links on top of and using their own physical resources and provide them to another party.

VNP is a provider which represents an intermediate party between a VNO and the infrastructure providers. This is depicted, for example, in FIG. 2 which shows a diagram illustrating the hierarchical levels of entities involved in a creation (or modification) of a virtual network, as well as the responsibilities thereof, in comparison to a "normal" (or conventional) network. The VNP is capable and equipped, for example, to compose and provide a virtual network slice as requested by a VNO from physical resources of one or more infrastructure providers. It is to be noted that, in the following specification, a VNP and a PIP/InP may be also referred to belonging to a lower provider level (when viewed from the VNO side), or the PIP/InP may be referred to belonging to a lower provider level (when viewed from the VNP side).

The VNO, on the other hand, can install and instantiate a network architecture using the virtual network slice and properly configure it. After the virtual network has been set up, end users may attach to it and use the service it provides. A VNO may provide a service in the virtual network by itself or allow other service providers to offer their services, e.g., an IP-TV service, inside the virtual network.

That is, the VNP is supposed to request and collect virtual resources from a PIP/InP, and to form a whole virtualized network on behalf of a VNO, which in turn operates this virtual network. In that way, the physical resources of a PIP/InP are separated and transformed into virtual resources provided to and managed by a VNP, and configured to form virtual networks finally handed over to VNOs for operation and use. In that way also the control of such virtual resources, even if implemented as shares of the same physical entities, is completely handed over to the virtual network operator using it.

FIG. 1 shows an exemplary example of a general virtual network topology. The virtual network may span various network domains that belong to different PIP/InP networks 1, 2, 3.

End users 4 to 6 can connect to the (virtual) network infrastructure. Within the network domains belonging to the different PIP/InP networks 1, 2, 3, the virtual network can use virtual or physical resources (virtual nodes are indicated by black filled circles, physical (or substrate) nodes are indicated by white filled circles) to create a virtual network via virtual links (indicated by dashed lines) which run over physical links (solid lines) established between respective nodes.

As for conventional networks, the operator of a virtual network is faced with certain requirements related to the quality of service and/or the grade of service provided by his network. Such requirements may, among others, include simple throughput capabilities (bandwidth capacity) with related delay and packet loss limitations, but also extend to parameters like service availability, e.g. measured in a percentage of time, or service reliability, measured e.g. as a probability of a service connection, once established, to be interrupted, and/or specifications for service restoration times in case of interruptions. A plenty of related parameters can be imagined with a lot of different ways to measure and evaluate related performance. Thus the examples listed here may be considered as representative, but in no way the list can be considered as exclusive or exhaustive.

Quality and grade of service related requirements are usually fixed in so called Service Level Agreements, SLAB, between the network operator and its customers and are often furnished with penalties for breach of contract. It is thus essential for a network operator to be able to specify such parameters and to guarantee compliance with related specifications.

Whereas it often turned out difficult for the owner of a physical network to specify and guarantee related SLAB, such agreements in view of parameters like service availability and reliability have been not possible up to now for virtual networks, as no mechanisms to reliably provide such properties and to control related parameters in a virtual network have been known.

SUMMARY OF THE INVENTION

It is an object of the invention to provide a method, system, apparatus, and computer program product by means of which an improved control mechanism for setting reliability and availability of resources of a virtual network can be provided.

In particular, it is an object of the invention to provide a method, a system, an apparatus, and a computer program product which are each usable in a network virtualization process for ensuring that a specific (minimum) reliability and availability level of resources used in the virtual network is achieved.

These objects are achieved by the measures defined in the attached claims.

According to an example of the proposed solution, there is provided, for example, a method for providing resources from a physical network, provided by at least one physical network provider, to a virtual network provider, the virtual network provider assembling these resources to compose at least one virtual network for providing telecommunication services, the method comprising the steps of: a) identifying a need for certain resources at the virtual network provider; b) requesting resources matching the identified need from the at least one physical network provider; c) conducting virtualization for creating the virtual network by: c1) identifying and selecting by the at least one physical network provider resources in the physical network based on the requested resources; c2) isolating the selected resources from other resources of the physical network and reserving them for exclusive use in the virtual network; c3) attaching unique identification, address and access information to the isolated and reserved resources in order to enable exclusive accessibility in the virtual network; d) reporting a result of the virtualization with information concerning identification, addressability and accessibility of the selected resources; and e) handing over control of the resources reserved for exclusive use in the virtual network; wherein the method further comprises steps of f) exchanging, in connection with the request for resources and/or the report on the result of the virtualization, information on an availability and reliability level of resources for the virtual network; and g) determining an availability and reliability level of the selected resources and generating an indication for an achieved availability and reliability level.

Furthermore, according to a further example of the proposed solution, there is provided, for example, a method for providing resources from a physical network, provided by at least one physical network provider, to a virtual network provider, the virtual network provider assembling these resources to compose at least one virtual network for providing telecommunication services, the method comprising the steps of: a) identifying a need for certain resources at the virtual network provider and an availability and reliability level to be achieved; b) requesting resources matching the identified need from the at least one physical network provider, wherein an indication concerning the availability and reliability level to be achieved is provided with the request; c) conducting virtualization for creating the virtual network by: c1) identifying and selecting by the at least one physical network provider resources in the physical network based on the requested resources and the indication concerning the availability and reliability level to be achieved; c2) isolating the selected resources from other resources of the physical network and reserving them for exclusive use in the virtual network; c3) determining an availability and reliability level of the selected resources and generating an indication for the achieved availability and reliability level; and c4) attaching unique identification, address and access information to the isolated and reserved resources in order to enable exclusive accessibility in the virtual network; d)

reporting a result of the virtualization with information concerning identification, addressability and accessibility of the selected resources and the indication concerning the achieved availability and reliability level; and e) handing over control of the resources reserved for exclusive use in the virtual network.

Furthermore, according to a further example of the proposed solution, there is provided, for example, a method comprising sending a request for providing resources for a virtual network from a virtual network operator level or a virtual network provider level to a lower provider level including either a virtual network provider level or an infrastructure provider level, the request comprising an indication regarding required availability and reliability level to be achieved by the resources of the virtual network.

According to further refinements, there may be comprised one or more of the following features:
the indication may comprises at least one of a metric for the required availability of resources to be provided; and a request for providing redundant resources including a diversity;
at the virtual network operator level or the virtual network provider level there may be received from the lower provider level a response to the request, the response may comprise one of a confirmation indicating that the required availability and reliability level is achievable by the resources of the virtual network, or a denial indicating that the required availability and reliability level is not achievable by the resources of the virtual network.

Furthermore, according to a further example of the proposed solution, there is provided, for example, a method comprising: receiving a request for providing resources for a virtual network from a virtual network provider level or a virtual network operator level at a lower provider level including either virtual network provider level or an infrastructure provider level, the request comprising an indication regarding required availability and reliability level to be achieved by the resources of the virtual network; and checking whether the required availability and reliability level is achievable for the resources to be provided for the virtual network.

According to further refinements, there may be comprised one or more of the following features:
the checking may be performed in a calculation procedure of network paths to be provided for the virtual network and/or a reservation procedure of the resources;
the indication may comprises at least one of a metric for the required availability of resources to be provided, and a request for providing redundant resources including a diversity;
there may be sent, at the lower provider level to the virtual network provider level or the virtual network operator level, a response to the request, the response may comprise a result of the checking indicating one of a confirmation indicating that the required availability and reliability level is achievable by the resources of the virtual network, or a denial indicating that the required availability and reliability level is not achievable by the resources of the virtual network.

Furthermore, according to a further example of the proposed solution, there is provided, for example, a method comprising: identifying at a virtual network provider a need for certain resources for a virtual network and determining an availability and reliability level to be achieved therefor; and requesting resources matching the identified need from at least one physical network provider, wherein the request comprises an indication regarding required availability and reliability level to be achieved by the resources of the virtual network.

According to further refinements, there may be comprised one or more of the following features:
the need for certain resources may be identified based on a given traffic demand created by users and/or a request from a customer and/or a request from a virtual network operator, regarding a modification of an existing virtual network or a creation of a new virtual network, and wherein the availability and reliability level to be achieved may be determined or derived on the basis of information provided with the traffic demand created by the users and/or a request from a customer and/or a request from a virtual network operator;
at the virtual network provider, information on resources allocated to the virtual network may be received, the information concerning identification, addressability and accessibility of selected resources and an indication concerning an achieved availability and reliability level thereof; a virtual network may be assembled on the basis of the received information on resources; and control of the resources reserved for exclusive use in the virtual network may be handed over to a virtual network operator.

According to a further example of the proposed solution, there is provided, for example, a system for providing resources from a physical network, provided by at least one physical network provider, to a virtual network provider, the virtual network provider assembling these resources to compose at least one virtual network for providing telecommunication services, the system comprising:
a) a virtual network provider controller configured to the steps of: a1) identify a need for certain resources at the virtual network provider; a2) request resources matching the identified need from the at least one physical network provider; b) a physical network provider controller configured to b1) conduct virtualization for creating the virtual network by: b1a) identifying and selecting by the at least one physical network provider resources in the physical network based on the requested resources; b1b) isolating the selected resources from other resources of the physical network and reserving them for exclusive use in the virtual network; b1c) attaching unique identification, address and access information to the isolated and reserved resources in order to enable exclusive accessibility in the virtual network; d) to report a result of the virtualization with information concerning identification, addressability and accessibility of the selected resources; wherein a control of the resources reserved for exclusive use in the virtual network is handed over to the virtual network provider controller; wherein the virtual network provider controller and the physical network provider controller are further configured to e) exchange, in connection with the request for resources and/or the report on the result of the virtualization, information on an availability and reliability level of resources for the virtual network; and f) determine an availability and reliability level of the selected resources and generating an indication for an achieved availability and reliability level.

According to a further example of the proposed solution, there is provided, for example, a system for providing resources from a physical network, provided by at least one physical network provider, to a virtual network provider, the virtual network provider assembling these resources to compose at least one virtual network for providing telecommunication services, the system comprising a) a virtual network provider controller configured to a1) identify a need for certain resources at the virtual network provider and an availability and reliability level to be achieved; and a2) to request resources matching the identified need from the at least one physical network provider, wherein an indication concerning the availability and reliability level to be achieved is provided with the request; b) a physical network provider controller configured to b1) conduct virtualization for creating the virtual network by: b1a) identifying and selecting by the at least one physical network provider resources in the physical network based on the requested resources and the indication concerning the availability and reliability level to be achieved; b1b) isolating the selected resources from other resources of the physical network and reserving them for exclusive use in the virtual network; b1c) determining an availability and reliability level of the selected resources and generating an indication for the achieved availability and reliability level; and b1d) attaching unique identification, address and access information to the isolated and reserved resources in order to enable exclusive accessibility in the virtual network; and c) report a result of the virtualization with information concerning identification, addressability and accessibility of the selected resources and the indication concerning the achieved availability and reliability level to the virtual network provider controller; wherein control of the resources reserved for exclusive use in the virtual network is handed over to the virtual network provider controller.

Furthermore, according to a further example of the proposed solution, there is provided, for example, a system comprising at a virtual network operator level or a virtual network provider level, a first processor configured to generate a request for providing resources for a virtual network, wherein the request is sent from the virtual network operator level, via a virtual network provider level, or from the virtual network provider level to an infrastructure provider level, the request comprising an indication regarding a required availability and reliability level to be achieved by the resources of the virtual network; and at an infrastructure provider level a second processor configured to receive and process the request, and to check whether the required availability and reliability level is achievable for the resources to be provided for the virtual network.

According to further refinements, there may be comprised one or more of the following features:

the second processor may be further configured to generate a response to the request and to send the response from the infrastructure provider level to the virtual network provider level or via the virtual network provider level to the virtual network operator level, the response comprising a result of the checking indicating one of a confirmation indicating that the required availability and reliability level is achievable by the resources of the virtual network, or a denial indicating that the required availability and reliability level is not achievable by the resources of the virtual network.

According to a further example of the proposed solution, there is provided, for example, an apparatus comprising a processor configured to generate a request for providing resources for a virtual network and to send the request from a virtual network operator level or a virtual network provider level to a lower provider level including either a virtual network provider level or an infrastructure provider level, the request comprising an indication regarding required availability and reliability level to be achieved by the resources of the virtual network.

According to further refinements, there may be comprised one or more of the following features:

the indication may comprise at least one of a metric for the required availability of resources to be provided; and a request for providing redundant resources including a diversity;

the processor may be further configured to receive, at the virtual network operator level or the virtual network provider level, a response to the request from the lower provider level, and to determine from the response one of a confirmation indicating that the required availability and reliability level is achievable by the resources of the virtual network, or a denial indicating that the required availability and reliability level is not achievable by the resources of the virtual network.

According to a further example of the proposed solution, there is provided, for example, an apparatus comprising a processor configured to receive a request for providing resources for a virtual network from a virtual network provider level or a virtual network operator level at a lower provider level including either a virtual network provider level or an infrastructure provider level and to process the request, the request comprising an indication regarding required availability and reliability level to be achieved by the resources of the virtual network; and to check whether the required availability and reliability level is achievable for the resources to be provided for the virtual network.

According to further refinements, there may be comprised one or more of the following features:

the processor may be configured to check whether the required availability and reliability level is achievable for the resources to be provided for the virtual network in a calculation procedure for a network structure comprising network paths to be provided for the virtual network and/or a reservation procedure of the resources;

the indication may comprises at least one of a metric for the required availability of resources to be provided; and a request for providing redundant resources including a diversity;

the processor may be further configured to generate a response to the request and to send the response from the lower provider level to the virtual network provider level or the virtual network operator level, the response comprising a result of the checking indicating one of a confirmation indicating that the required availability and reliability level is achievable by the resources of the virtual network, or a denial indicating that the required availability and reliability level is not achievable by the resources of the virtual network.

According to a further example of the proposed solution, there is provided, for example, an apparatus comprising an processor configured to identify at a virtual network provider a need for certain resources for a virtual network and to determine an availability and reliability level to be achieved therefor; and to request resources matching the identified need from at least one physical network provider, wherein the request comprises an indication regarding required availability and reliability level to be achieved by the resources of the virtual network.

According to further refinements, there may be comprised one or more of the following features:

the processor may be further configured to identify the need for certain resources based on a given traffic demand created by users and/or a request from a customer and/or a request from a virtual network operator, regarding a modification of an existing virtual network or a creation of a new virtual network, and wherein the processor is further configured to determine or derive the availability and reliability level to be achieved on the basis of information provided with the traffic demand created by the users and/or a request from a customer and/or a request from a virtual network operator;

a receiver may be provided which is configured to receive at the virtual network provider information on resources allocated to the virtual network, the information concerning identification, addressability and accessibility of selected resources and an indication concerning an achieved availability and reliability level thereof, wherein the processor may be further configured to assemble a virtual network on the basis of the received information on resources, and to hand over control of the resources reserved for exclusive use in the virtual network to a virtual network operator.

In addition, according to other examples of the proposed solution, there is provided, for example, a method comprising receiving a response at a virtual network operator level or a virtual network provider level from a lower provider level including either a virtual network provider level or an infrastructure provider level, to a request for providing resources for a virtual network, the response comprising an indication regarding an availability and reliability level achievable by the resources of the virtual network.

According to further refinements, there may be comprised one or more of the following features:
on the virtual network operator level or the virtual network provider level, it may be determined whether the availability and reliability level achievable by the resources of the virtual network matches a required level of availability and reliability; and in case the determination is negative, a further request for providing additional resources for the virtual network may be sent to the lower provider level;
the indication regarding an availability and reliability level achievable by the resources of the virtual network may comprise at least one of a metric for an achievable availability of provided resources; and an identification of a physical entity related to the provided resources.

In addition, according to the other examples of the proposed solution, there is provided, for example, a method comprising determining an availability and reliability level achievable for resources to be provided for a virtual network requested in a request from a virtual network provider level to an infrastructure provider level, sending a response at the infrastructure provider level to the virtual network provider level to the request for providing the resources for the virtual network, the response comprising an indication regarding the determined availability and reliability level achievable by the provided resources of the virtual network.

According to further refinements, there may be comprised one or more of the following features:
the determination may be performed in a calculation procedure of network paths to be provided for the virtual network and/or a reservation procedure of the resources;
the indication regarding an availability and reliability level achievable by the resources of the virtual network may comprise at least one of a metric for an achievable availability of provided resources; and an identification of a physical entity related to the provided resources.

Furthermore, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide an improved mechanism for creating/modifying a virtual network wherein a specific reliability and availability level of the virtual network and the resources used therein can be ensured.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings. For illustrating the present invention, the examples and embodiments will be described in connection with a generally described network architecture. It is to be noted that the present invention is not limited to an application to a specific system or environment but is applicable in network structure where virtual resources can be selected and isolated for a usage in a virtual network and the like.

The described network elements and functions, such as physical nodes on the infrastructure provider level, or processing or control entities used in any of the VNO, VNP or PIP/InP level, may be implemented by software, e.g. by a computer program product for a computer, and/or by hardware. In any case, for executing their respective functions, correspondingly used nodes, devices and network entities may comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for entering data and instructions by software (e.g. floppy diskette, CDROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Figure 1:
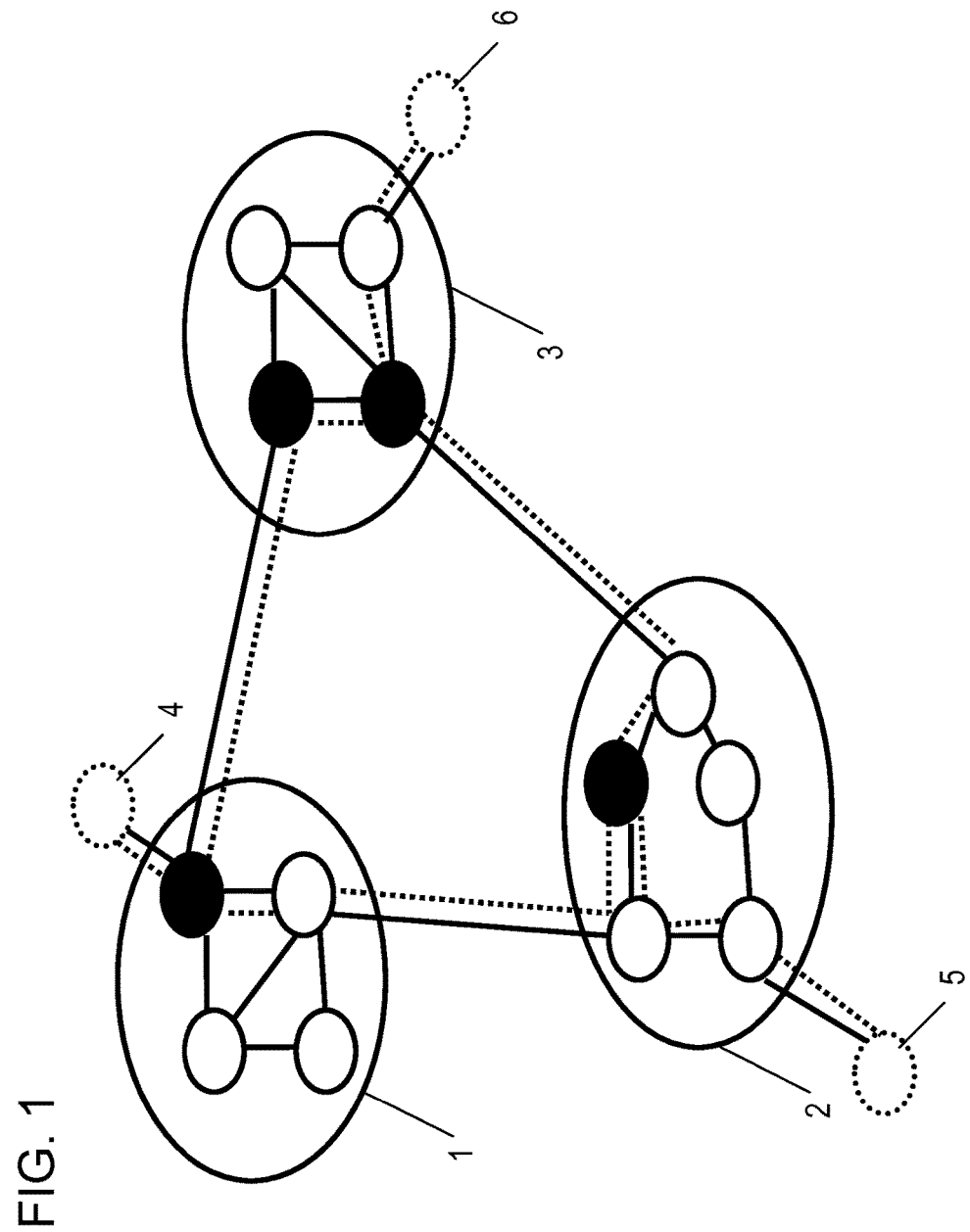
FIG. 1 shows a diagram illustrating a general virtual network topology.
Figure 2:
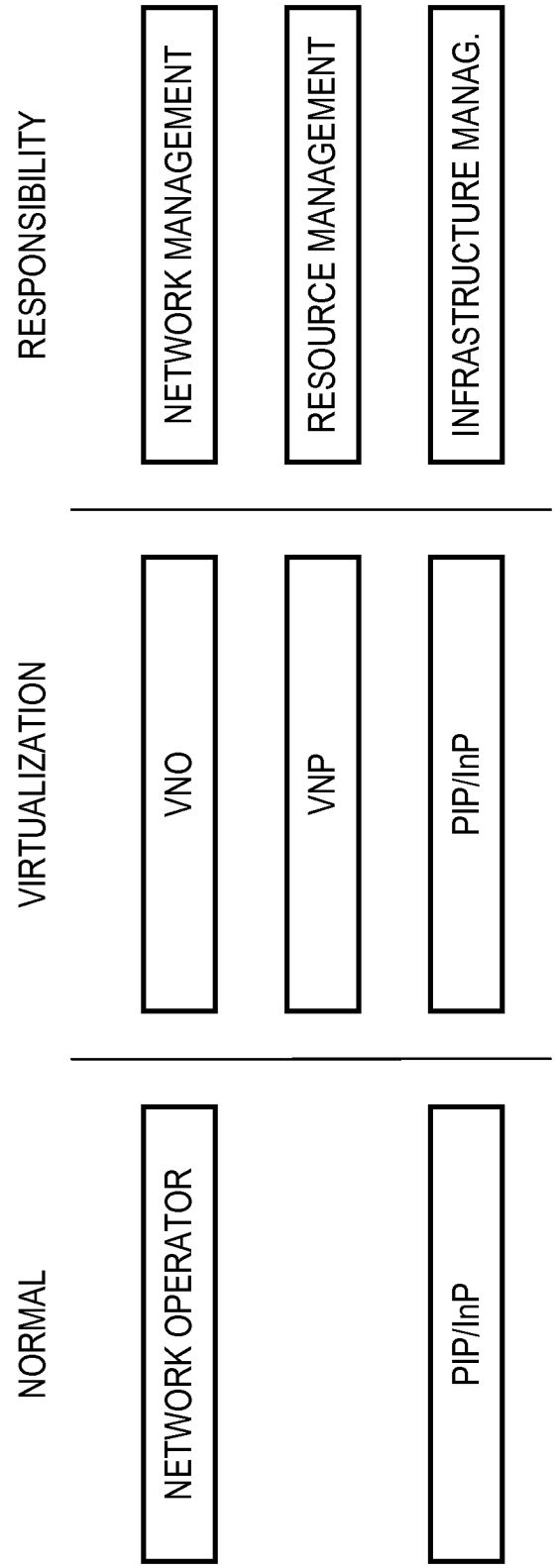
FIG. 2 shows a diagram illustrating hierarchical levels of elements related to a virtual network provision and the responsibilities thereof.

Basically, in order to establish a virtual network such as that shown in FIG. 1, the following processes or steps can be conducted for network virtualization. These processes can be conducted, for example, between hierarchical levels as depicted in FIG. 2, i.e. between a VNO level, a VNP level and a PIP/InP level (that is between corresponding controllers or the like being responsible for conducting a processing in the respective level).

First, in a virtual network design phase, an operator of the virtual network to be established, such as the VNO, describes generally the required topology, resources and corresponding additional constraints, for example, QoS constraints for virtual links or geographic restrictions for virtual nodes. Therefore the amount of resources required to provide the intended service is to be estimated, but at this phase, as the virtual network can be modified (e.g. shrunk or expanded) later on, this merely needs to be a rough guess.

Then, virtual network provisioning is executed. That is, when the description is passed on to a provider of a virtual network, such as a VNP, the VNP constructs the virtual network by requesting (virtual) resources from available physical resources. Therefore, the VNP forwards a description of the virtual network or parts of it to one or more actual infrastructure providers, such as PIP/InPs.

On the PIP/InP level, the actual network virtualization is conducted, i.e. resources are selected, isolated and reserved so as to provide those resources which are necessary to fulfill the request. If the virtual network topology creation has been successful, access information related to the resources attached to the virtual network is provided from the PIP/InP to the VNP, so that the VNP is able to give the VNO full access to the virtual network topology. Such access information may e.g. comprise one or more of an identification (or name) allocated to a certain piece of resources, a physical address and/or a virtual address for accessing these resources for use, information about protocols supported by or required for using these resources, a physical and/or virtual address for getting access to control of these resources, protocols to be used for controlling these resources, or any other information required for or suitable to support access to the usage and/or the control of these resources.

It is to be noted that the request and the provision of resources for an already existing network is also possible in a corresponding manner, i.e. also a further modification of the virtual network may be possible, e.g. an execution of extension or shrinking of the virtual network, a modification of QoS requirements, or a tear-down of the virtual network.

According to examples of embodiments of the present invention, there are provided mechanisms which enable a setting of parameters concerning availability and reliability of resources of the virtual network so as to ensure that a specific (minimum) reliability and availability level of the resources of the virtual network can be achieved.

In order to provide high availability and high quality of services in virtual networks, resource reservation and fast protection mechanisms, based for example on redundancy and path diversity, can be used. However, it is to be considered that after the network virtualization, i.e. the establishment of the virtual network, also virtual resources are used and operated by a VNO in his own virtual network. These virtual resources are based, as indicated above, on physical resources which are allocated (in total or only parts thereof) to a virtual resource of the virtual network.

This configuration, however, may lead to complex interdependencies in the physical layer up to sharing the same physical entity (node, line card, link etc.) for different virtual resources. In other words, one and the same physical resource is theoretically the source for different virtual resources. Therefore, examples of embodiments of the present invention consider this possibility for the reliability and availability level to be achieved so as to ensure that if a physical entity fails, which results also in that virtual resources depending on that physical entity simultaneously fail, the redundancy of the network is set such that it is still operable, for example by ensuring that redundancy relevant virtual resources are also set-up in divers physical resources.

Thus, according to examples of embodiments of the invention, in order to enable and ensure a dependable operation of a virtual network, there are provided the following mechanisms.

Generally, when a virtual network is to be generated or an existing virtual network is to be modified, a resource reservation (or release) in the PIP/InP network for providing (releasing) the virtual resources is conducted. For this purpose, it is necessary to exchange information between the elements or entities involved in the creation/modification of the virtual network in the different levels, such as e.g. the VNO, VNP and PIP/InP as described above.

According to examples of embodiments of the invention, with this information exchange, also information related to the setting of reliability and availability requirements or levels in the virtual network is signaled between these entities. Thus, respective control elements or processors in the respective hierarchical level (VNO, VNP, PIP/InP) can conduct a processing to ensure that the virtual network fulfills requirements concerning the reliability or availability, or to learn that the virtual network can not fulfill (in the present form) the requirements, which may lead to a further modification such as a request for additional resources. It is to be noted that indications and information regarding required or achievable reliability and availability levels can be exchanged between one or more VNOs, VNPs and/or PIP/InPs, respectively. That is, for example, since a VNO may request the creation of a virtual network on the basis of resources provided by more than one PIP/InP, respective reliability and availability related information can be exchanged between the VNO through a VNP to several PIP/InPs, wherein the requirements may be different for each PIP/InP, for example.

Figure 3:
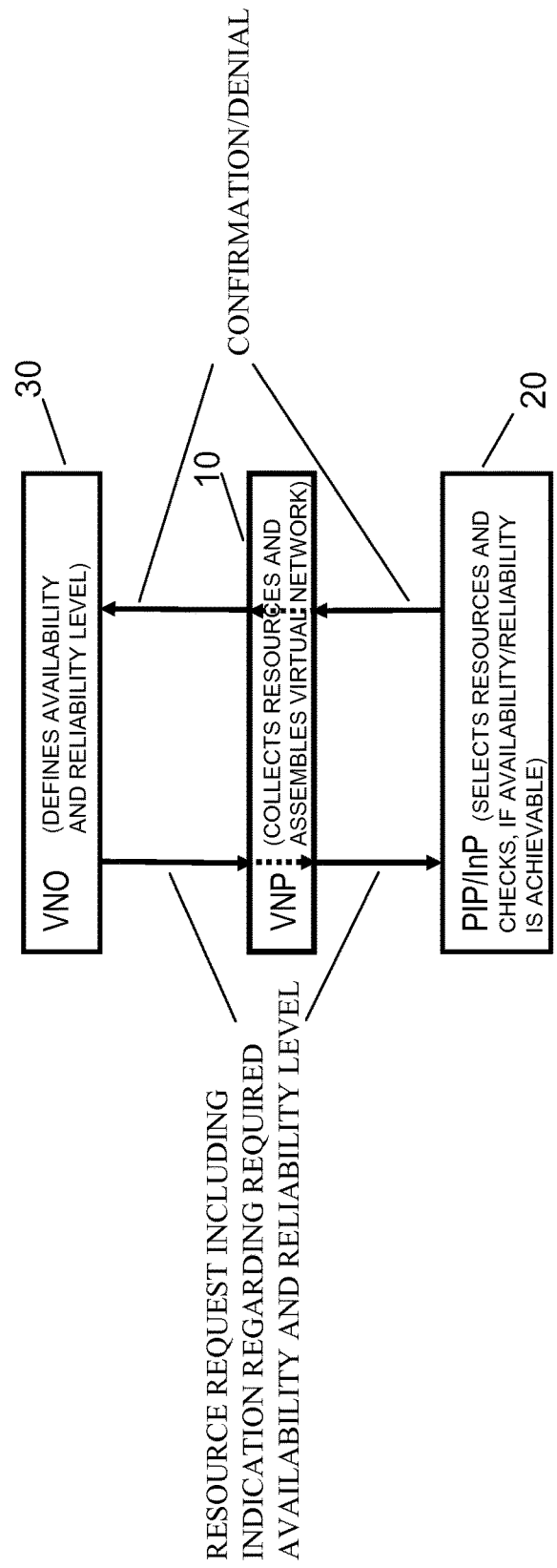
FIG. 3 shows a diagram illustrating a first alternative of an example of an embodiment of the invention for a control mechanism used for setting reliability and availability of resources of a virtual network.

In FIG. 3, a first alternative of examples of embodiments of the invention is shown. According to FIG. 3, in a system comprising a VNO 30, a VNP 10 and a PIP/InP 20, it is defined in the VNO 30 that a virtual network has to fulfill certain reliability and availability requirements. For example, as a reliability requirement, it may be required that a redundancy of virtual resources is provided wherein it has to be ensured that redundant virtual resources do not share any common physical resources, i.e. in no place are running via or are provided by the same physical resource. By means of this, a failure of a physical resource does not immediately cause a failure of the redundant virtual resource, for example. Or, as another reliability and availability requirement, a certain level of availability may be defined, such as e.g. 99.9% (three nines), 99.99% (four nines), or 99.999% (five nines) etc., as a value or metric for the reliability and availability requirement.

This requirement indication is then sent from the VNO 30 via the VNP 10 towards the PIP/InP 20, for example in combination with a request for resources to be provided for a virtual network requested by the VNO 30. That is, the control element of the VNO 30 may signal an indication regarding a required (minimum) availability and/or reliability level to the control element of the VNP 10, which addresses related requirements to one ore more PIP/InPs, where a virtualization of physical PIP/InP resources is conducted to enable the creation (or modification) of a virtual network that fulfills the initial requirement(s) as specified by the VNO.

The VNP 10 receiving the resource request including the indication regarding the required availability and reliability level processes the requests and starts to request, from one or more PIP/InPs, the allocation (selection, reservation and isolation together with the provision of access thereto) of corresponding resources from the PIP/InPs' networks. In other words, when the VNP 10 identifies the need to request resources for a virtual network and determines also a requirement for an availability and reliability level to be achieved for the virtual network and/or its resources, it requests corresponding resources from one or more infrastructure provides. Thus, for example, the VNP 10 sends a respective request for resources to one or more PIP/InPs 20, wherein the availability and reliability indication is considered and indicated as well.

According to examples of embodiments of the invention, the need for certain resources is concluded when, for example a certain traffic demand created by users is received. Alternatively or additionally, a request from a customer and/or a request from a virtual network operator regarding a modification of an existing virtual network or a creation of a new virtual network may be used for identifying the need for resources. In this connection, the availability and reliability level to be achieved may be determined by using a corresponding indication in information used for identifying the need for resources (e.g. an indication for minimal requirements), or derived on the basis of this information (e.g. a general indication for a high quality link or the like).

On the PIP/InP 20 side, the resource request as well as the indication for a required reliability and availability level received via the signaling from the VNP 10 side is processed, e.g. in a corresponding control element. That means, for example, when virtual resources to be allocated to the requested resources for the virtual network are determined, at the same time, it is calculated or checked whether these resources are also able to fulfill the required reliability and availability requirements. For example, it can be checked whether there are sufficient physical links between nodes so as to fulfill a required redundancy requirement, or if the quality of a link between nodes is within the availability requirement, or the like.

As an option, the PIP/InP 20 by himself may decide to implement a certain requirement by using physically redundant resources supported by e.g. fast restoration and/or protection mechanisms, manage these physical resources and the related restoration and protection mechanism by himself, and provide a related highly available virtual resource to the VNP 10.

When the processing on the PIP/InP 20 side is finished, a result thereof is sent to the VNP 10 as a response to the signaling related to the required reliability and availability level, e.g. in connection with a response to the resource request. For example, the PIP/InP 20 sends a confirmation indication that the requirements can be achieved by the resources allocated to the virtual network. For example, a corresponding confirmation can be sent together with access information indicating selected and isolated resources provided by the PIP for the virtual network. Otherwise, in case the processing in the PIP/InP 20 results that the requirements regarding reliability or availability can not be fulfilled, a denial is returned to the VNP 10. The denial can be sent for example as a separate signaling causing also a cancellation or restart of the creation of the virtual network, or together with access information indicating selected and isolated resources provided by the PIP/InP 20 for the virtual network which do not fulfill the availability and reliability requirements.

The VNP 10 receives and processes the reply signaling related to the required reliability and availability level, e.g. in connection with the response to the resource request. That means the VNP 10 collects, for example, resources for the virtual network to be created, i.e. it assembles the resources for the virtual network. Furthermore, it determines whether the indication concerning the availability and reliability level to be achieved is a confirmation or a denial. This confirmation and denial can then be forwarded to the VNO 30 as reply to the original indication concerning reliability and availability.

It is to be noted that the definition of the availability and reliability level to be achieved, which is described above as being done on the VNO 30 level, could also be done on the VNP 10 level, for example in case only an indication of the VNO 30 to provide a specific type of virtual network, such as a high security virtual network or the like, is received on the VNP 10 side, which then determines, for example from a database or the like, parameters like the indicated metric or a degree of redundancy which are then forwarded to the PIP/InP 20.

As a further option, the VNP 10 may request and reserve (virtual) resources from a PIP/InP 20 in advance and keep them on stock. Thus not every request from a VNO 30 does necessarily have to result in a corresponding request to a PIP/InP 20 (this corresponding request is processed so to say beforehand). The VNP 10 can use such resources in the composition and assembly (or modification) of a virtual network for a VNO 30 as convenient. Any information related to availability and reliability of such resources can be evaluated against the related requirements and taken into account for such purposes.

Figure 4:
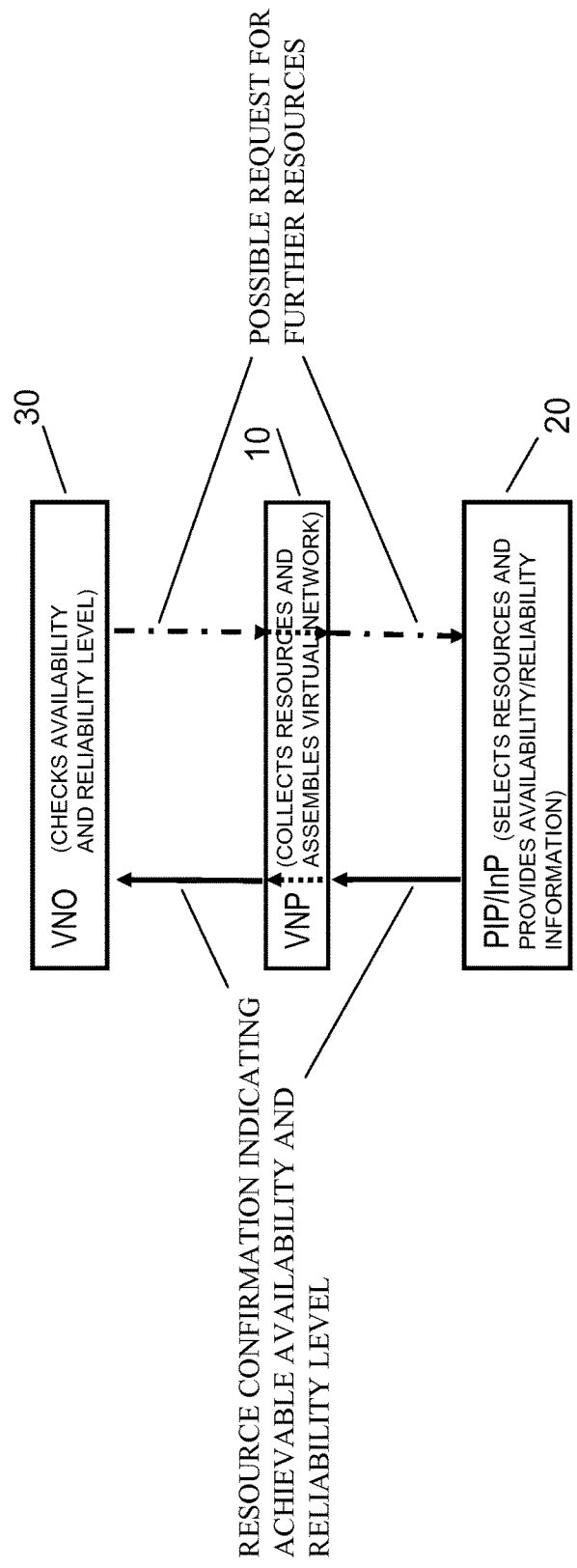
FIG. 4 shows a diagram illustrating a second alternative of an example of an embodiment of the invention for a control mechanism used for setting reliability and availability of resources of a virtual network.

In FIG. 4, a second alternative of examples of embodiments of the invention is shown. According to FIG. 4, in a system comprising the VNO 30, the VNP 10 and the PIP/InP 20, the PIP/InP 20 determines, when virtual resources to be allocated to a requested virtual network are selected, at the same time an achievable reliability and availability level of the resources. This determination can be executed, for example, by a control element on the PIP/InP side 20. For example, it can be checked whether there are different physical links between nodes so as to determine a redundancy level, or which quality a link between nodes has so as to derive a ratio of availability, such as a metric for the availability requirement (e.g. three nines, four nines, or five nines etc.), or the like.

When the determination regarding the achievable reliability and availability level is finished on the PIP/InP 20 side, the result is sent towards a requestor for resources for a virtual network, e.g. to the VNP 10, with a response to a resource request, for example. The result can be signaled, for example, by an information indicating the calculated results for reliability and availability parameters. For example, a corresponding confirmation can be sent together with access information indicating the selected and isolated resources provided by the PIP/InP 20 for the virtual network.

When receiving the indication regarding the achievable reliability and availability level of a resource allocated to a virtual network, the receiving entity (VNP 10 and/or the VNO 30), i.e. a control element thereof, processes the request. That is, for example, on the VNP 10 side, the response to the resource request including, for example, access information as described above and the indication concerning the achievable reliability and availability level of the resources are determined, and the VNP 10 collects, for example, resources for the virtual network to be created, i.e. it assembles the resources for the virtual network. Furthermore, it checks whether the indication concerning the achievable availability and reliability level matches a corresponding requirement. This information can be also forwarded to a VNO (the VNO 30) for which the virtual network is to be created/modified. Then, it is decided, e.g. by the VNP 10 or the VNO 30 side, whether the achievable level for the reliability and availability matches a required level. In other words, it is checked on the receiving side whether sufficiently available resources are offered or selected for the requested virtual network. If the determination is positive, the processing may end. Otherwise, in case it is determined that the resources do not suffice, it is possible that additional resources are requested, e.g. by the VNO 30 or by the VNP 10, wherein the request for additional resources is to be sent to a PIP/InP. Such a request may be a simple additional request for resources, similar to the original one, or may be a more detailed request comprising additional information concerning the required level of reliability and availability, for example based on the first alternative described in connection with FIG. 3.

As described above with regard to the first and second alternatives of examples of embodiments of the invention, one requirement regarding availability and reliability is, for example, to ensure a reliability level based on a certain redundancy of resources. As a consequence, it may be required that redundant resources in the final virtual network are also fully redundant in the underlying physical resources. As a possible further embodiment of the invention, this can be achieved, for example, by introducing in the request for resources a diversity (e.g. a path diversity) requirement, either in the form of a corresponding request to a first request or alternatively within a single redundant resource request. Thus, it can be avoided that the same physical shared risk link group (SRLG) is used by redundant virtual resources so that a failure of one physical resource does not lead to a loss of service, for example. Such a request, which can be introduced in the indication for a required availability and reliability level by the control element on the requesting side (e.g. VNO or VNP side), can directly request a pair of redundant resources (paths), refer to an accompanying (redundant path) request, or to a resource already allocated for an existing virtual network. With regard to the second alternative illustrated in FIG. 4, it is also possible that the PIP/InP 20 adds a physical entity or SRLG information with the resources provided so that it can be determined on the requestor side (e.g. the VNP or the VNO) whether two virtual resources share the same physical resource, for example, which then can lead to the issuance of a corresponding request for modifying resources, for example.

With regard to the above described first alternative of examples of embodiments according to FIG. 3, it is to be noted that this mechanism enables the PIP/InP 30 to autonomously dispose on the resources in its network, without a need to involve any of the customers (i.e. requestors of resources for a virtual network) as long as it is possible to satisfy the availability and diversity requirements. This encompasses also a control of already granted resources. Therefore, the first alternative is in particular advantageous with regard to failure and traffic management as well as network rearrangements, augmentation and upgrade in the physical network.

The above described examples of embodiments of the invention are based on a 'vertical' conveyance of information related to the required or achievable reliability and availability level of resources of a virtual network between the control layers of the different provider levels, such as the VNO, VNP and PIP related levels. Signaling or control protocols, which can be used for "vertically" exchanging information e.g. regarding the reliability and availability level between the VNO/VNP/PIP levels, may be based on protocols used for network control as such, i.e. protocols related to the control of physical network resources from a separate control layer, for example, protocols based on present or enhanced versions of PCEP, FORCES or Open-Flow.

Figure 5:
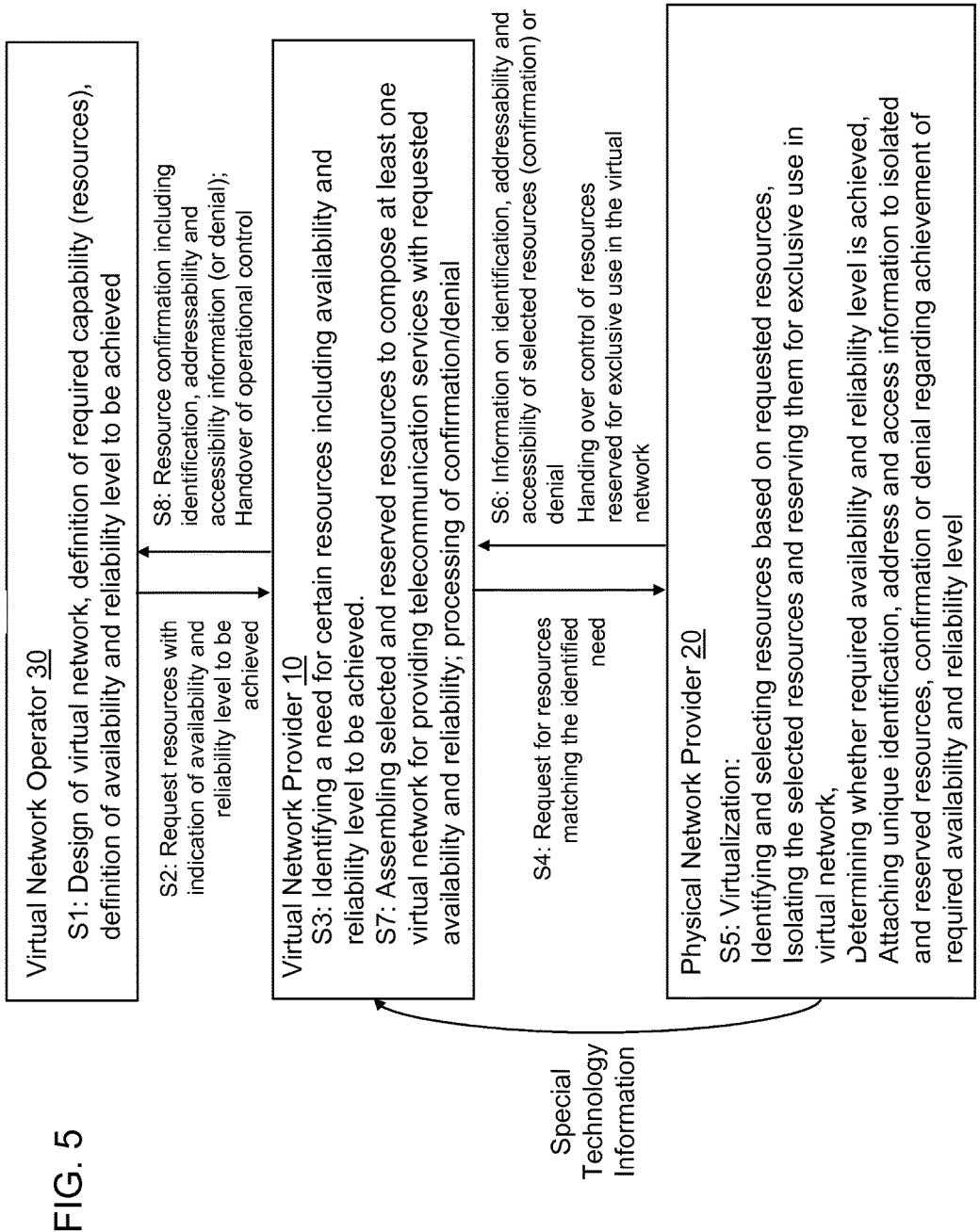
FIG. 5 shows a diagram illustrating an implementation example of the first alternative of an example of an embodiment of the invention in a system used for creating a virtual network.

Referring to FIG. 5, an implementation example of the first alternative of an example of an embodiment of the invention according to FIG. 3 in a system used for creating a virtual network is described.

In FIG. 5, similar to the general structure depicted in FIG. 3, a VNO 30, a VNP 10 and a PIP/InP 20 as a physical network provider, according to examples of embodiments of the invention are shown. As indicated above, there may be more than one PIP/InP 20 which provides a physical network from which resources can be provided to the VNO/VNP.

In step S1, the VNO 30, which represents in the present example a requestor for a creation of a virtual network, defines design rules for the virtual network including a definition of required capabilities of resources to be provided (such as a bandwidth, a memory/buffer space, etc.). Furthermore, a required level of reliability and availability which is to be achieved in the virtual network to be created is set. For example, it is defined that an availability rate of 99.9% ('three nines') is necessary, or that all links have to be redundant on the physical resources.

In step S2, a corresponding resource request (or at least a definition describing the needed resources for the virtual network to be created) together with the indication of the availability and reliability level to be achieved is sent to the VNP 10, for example together with the design information of the virtual network.

When the VNP 10 identifies a need for certain resources in a step S3, it requests resources matching the identified need from the PIP/InP 20 in step S4. Together with this request, the indication of the availability and reliability level to be achieved is sent to the PIP/InP 20.

Upon receiving the request, in step S5, the PIP/InP 20 conducts a virtualization for enabling the VNP 10 to create a virtual network out of resources based on the physical network provided by the PIP/InP 20. It is to be noted that the VNP 10 may create more than one virtual network out of resources provided by the PIP/InP 20.

In the virtualization, the PIP/InP 20 identifies and selects resources in the physical network based on the requested resources (for example by means of generating a network path structure based on ERO, SERO indications, conducting a reservation processing using RSVP or the like, receiving a result of the reservation by using RRO or SRRO indications, and the like), isolates the selected resources from other resources of the physical network and reserves them for exclusive use in the virtual network, and attaches unique identification, address and access information to the isolated and reserved resources in order to enable exclusive accessibility in the virtual network. Furthermore, it determines whether the selected resources fulfill the reliability and availability requirements indicated in S4. If the determination is positive, a confirmation information can be generated and added to the identification, address and access information. Otherwise, in case the determination is negative, a denial information can be generated.

In step S6, the PIP/InP 20 reports to the VNP 10 a result of the virtualization with information concerning identification, addressability and accessibility of the selected resources, as well as the information regarding confirmation or denial of the requirement concerning availability and reliability to be achieved. Furthermore, it hands over control of the resources to the VNP 10, which are reserved for exclusive use in the respective virtual network.

It is to be noted that as one further alternative of examples of embodiments of the invention, in case a denial of the requirement concerning availability and reliability to be achieved is to be sent, only this information may be returned to the VNP 10.

In step S7, the VNP 10 assembles these resources to compose the virtual network e.g. for providing telecommunication services. Furthermore, it processes the information regarding the availability and reliability level. For example, the composing of the virtual network, i.e. the assembly of resources, is done in such a manner that the required availability and reliability level is achieved. That is, according to a further example of embodiments, also the VNP 10 can determine that the final virtual network is able or not able to ensure the required reliability and availability level, and generate a corresponding confirmation information or denial information, or initiate the request of additional resources.

Then in step S8, a response regarding the request to provide a virtual network is sent to the VNO 30, i.e., for example, a confirmation regarding resources for the virtual network together with identification, addressability and accessibility information and regarding the achievement of the required availability and reliability level by the selected resources, or the denial information. In addition, by means of this response, the operational control over the resources allocated to the virtual network may be handed over.

It is to be noted that according to further examples of embodiments of the invention, the VNP 10 may identify the need for certain resources based on a given traffic demand created by users, a request from a customer or a request from a virtual network operator, regarding a modification of an existing virtual network or a creation of a new virtual network.

According to further examples of possible embodiments of the invention, the PIP/InP 20 may advertise to the VNP 10 capabilities and capacities regarding technological attributes of the physical network even with no specific request for resources pending. For example, the PIP/InP 20 may offer a router or a switch of a certain transmission technology and a link having special bandwidth, wherein this advertisement may also include an indication regarding an achievable reliability and availability level, for example.

According to further examples of embodiments of the invention, in the virtualization, the PIP/InP 20, i.e. a control element thereof, may compute a network structure out of the selected resources, including paths between nodes, determine whether a signaling to a starting node of the paths is routed via other nodes being not part of the selected resources, and if the determination is positive, include in the signaling an indication for informing the other nodes that they are not part of the selected resources. Together with this computation, for example, the PIP/InP 20 computes also whether the required level of availability and reliability can be achieved.

Furthermore, according to further examples of embodiments of the invention, in the virtualization, the PIP/InP 20 may determine whether to allow a conjunction between nodes on branched network paths, and if the determination is positive, include in the signaling an information element indicating the nodes between which the conjunction is to be established, such as a CAA or a CAP. The PIP/InP 20 may then report information on allowed conjunctions between the nodes to the VNP 10 in the information concerning identification, addressability and accessibility of the selected resources (S4).

According to examples of embodiments of the invention, the resources selected in the virtualization may comprise at least one of the following group or groups:
  network nodes or parts of them,
  control entities including computing devices, or parts of them including shares of memory, processing capacity, execution times,
  ports,
  links,
  transmission capacities, and
  paths comprising partial paths and/or end-to-end paths.
    The reliability and availability level is determined by considering the respective type of resource.

Furthermore, according to examples of embodiments of the invention, a network node or a node may comprises a role or function of at least one of the following group or groups:
  an access node,
  point of presence (POP),
  transit node, and
  traffic and/or signaling gateway.

Ports, links, transmission capacities and paths may be implemented on and using physical entities of any type of transmission technologies comprising at least one of the following group or groups:
  analog or digital,
  electrical or optical, and
  using wires, fibers or radio transmission.

Figure 6:
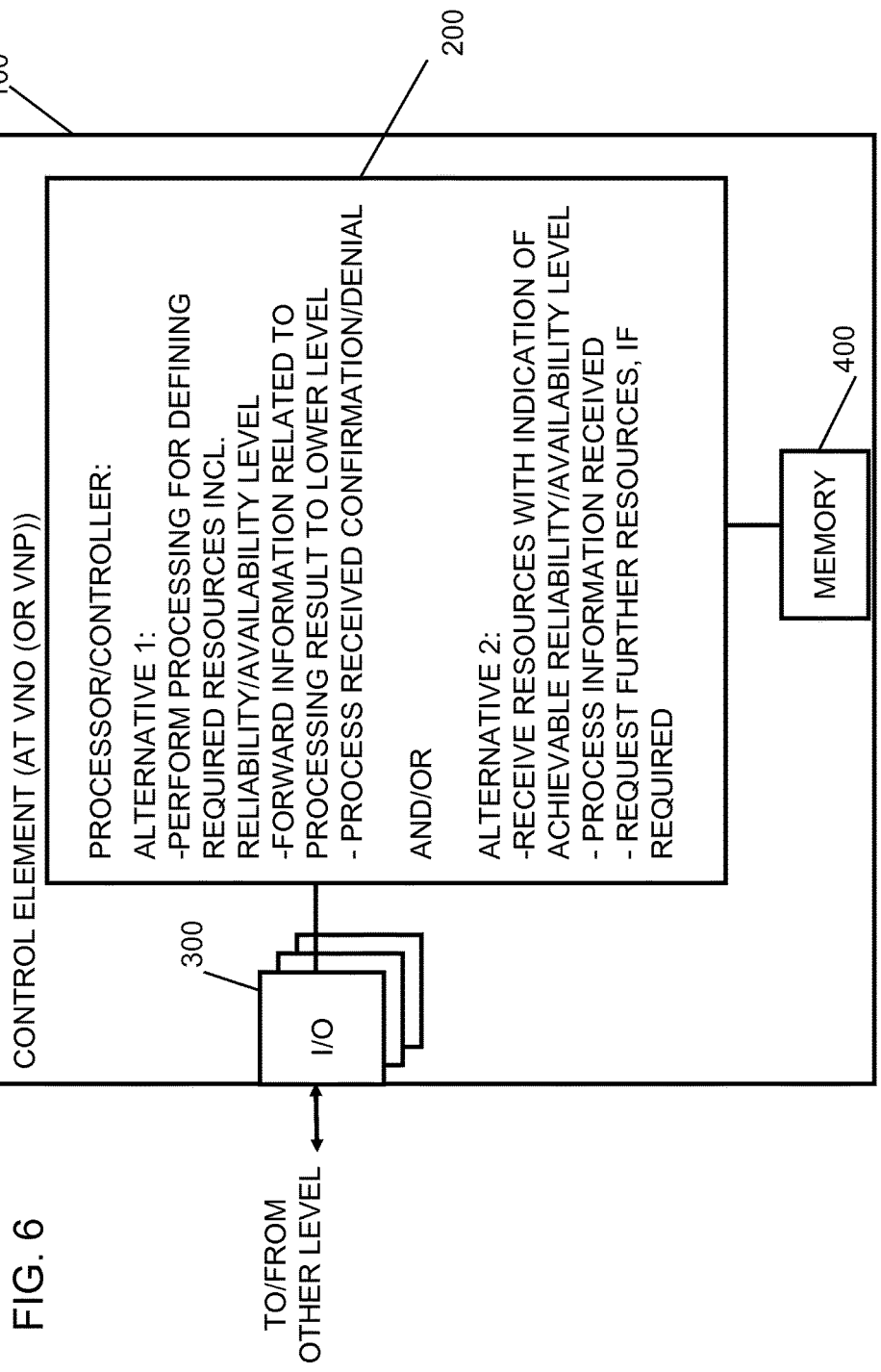
FIG. 6 shows a block circuit diagram illustrating a configuration of a control element in which examples of embodiments of the invention are implementable.

FIG. 6 shows a block circuit diagram illustrating a configuration of a control element 100 in which examples of embodiments of the invention are implementable. Specifically, FIG. 6 shows a block circuit diagram of a control element on the VNO (or VNP) level which is configured to exchange and process information related to the reliability and availability level in a virtual network. It is to be noted that the control element 100 shown in FIG. 6 may comprise several further elements or functions besides those described in connection therewith but which are omitted herein for the sake of simplicity as they are not essential for understanding the invention.

The control element 100 may comprise a processing function or processor 200, such as a CPU or the like, which executes instructions given by programs or the like related to the reliability and availability setting control. The processor 200 may comprise further portions dedicated to specific processings as described below. Portions for executing such specific processings may be also provided as discrete elements or within one or more further processors, for example. Reference sign 300 denotes transceivers or input/output (I/O) units connected to the processor 200. The I/O units 300 may be used for communicating with other network elements or functions, such as other hierarchical levels like the PIP/InP level or the VNP level according to FIG. 3 or FIG. 4. Reference sign 400 denotes a memory usable, for example, for storing data and programs to be executed by the processor 200 and/or as a working storage of the processor 200.

The processor 200 is configured to execute processings related to the mechanisms described in connection with the first and second alternatives according to FIG. 3 or FIG. 4.

In particular, when acting in accordance with the first alternative according to FIG. 3, the processor 200 is usable for defining the required resources including the determination of a required reliability and availability level and to forward corresponding information regarding the request for resources and the indication of the required reliability and availability level to the lower provider level, i.e. the VNP or the PIP/InP. Furthermore, the processor 200 is usable for processing, besides a response to the request for resources, a received indication concerning the achievable reliability and availability level, i.e. the confirmation or denial information.

Otherwise, when acting in accordance with the second alternative according to FIG. 4, the processor 200 is usable for receiving and processing information regarding resources allocated to the virtual network (in response to the request) and an indication concerning the achievable reliability and availability level sent from the lower provider level, i.e. the VNP or the PIP/InP, and to request, if necessary, additional resources.

As indicated above, a combination of the mechanisms of the first and second alternatives according to FIGS. 3 and 4 is possible. For example, an indication in the second alternative of an insufficient reliability and availability level achievable by the resources may trigger a processing according to the first alternative in order to request additional resources. In another example, one of the first or second alternatives according to FIGS. 3 and 4 is used for a request at one PIP/InP, while the other one of the first or second alternatives according to FIGS. 3 and 4 is used for a request at another PIP/InP, for example based on a compatibility of the respective PIP/InP.

Figure 7:
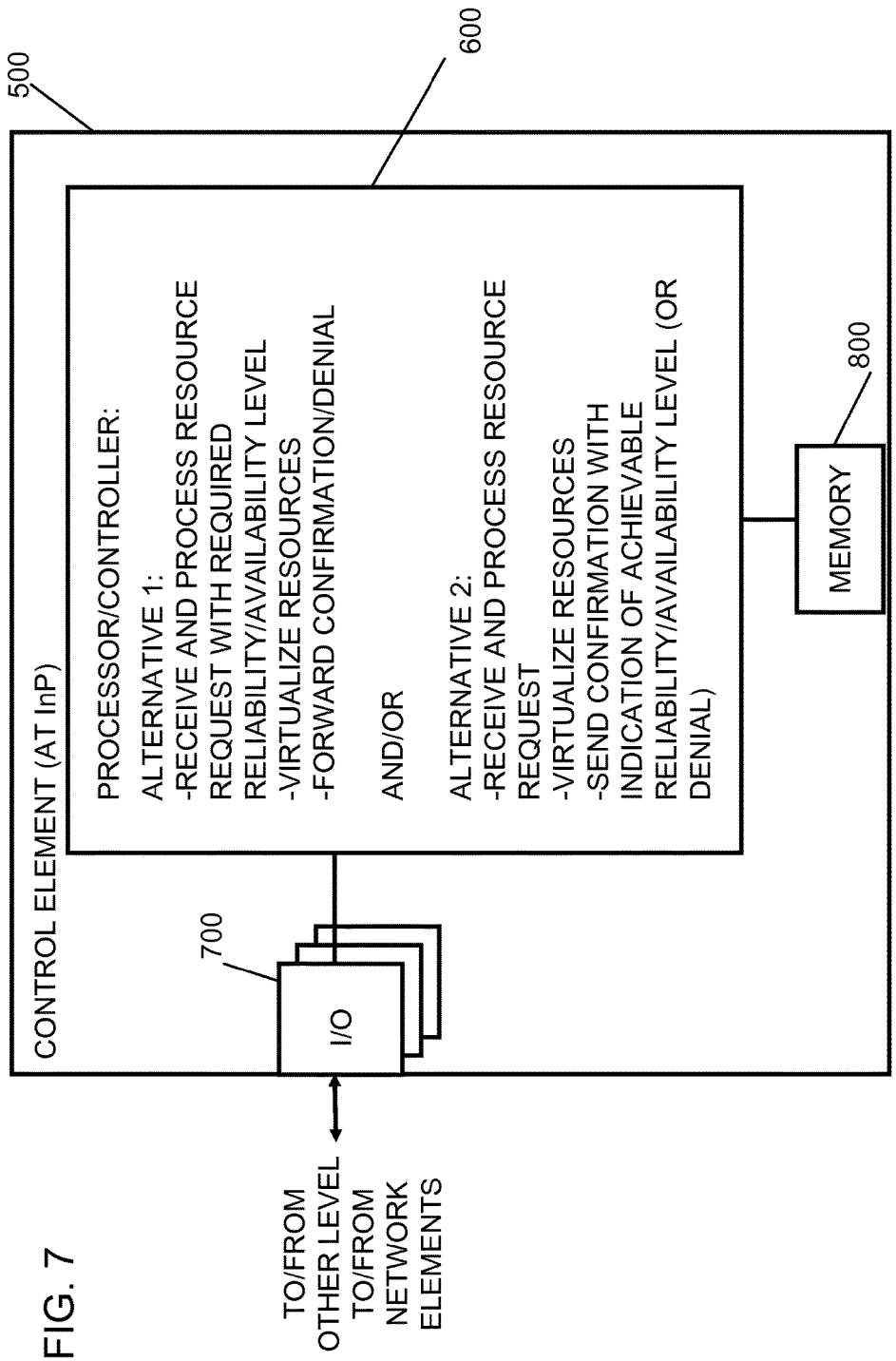
FIG. 7 shows a block circuit diagram illustrating a configuration of another control element in which examples of embodiments of the invention are implementable.

FIG. 7 shows a block circuit diagram illustrating a configuration of a control element 500 in which examples of embodiments of the invention are implementable. Specifically, FIG. 7 shows a block circuit diagram of a control element on the PIP/InP level which is configured to exchange and process information related to the reliability and availability level in a virtual network. It is to be noted that the control element 500 shown in FIG. 7 may comprise several further elements or functions besides those described in connection therewith but which are omitted herein for the sake of simplicity as they are not essential for understanding the invention.

The control element 500 may comprise a processing function or processor 600, such as a CPU or the like, which executes instructions given by programs or the like related to the reliability and availability setting control. The processor 600 may comprise further portions dedicated to specific processings as described below. Portions for executing such specific processings may be also provided as discrete elements or within one or more further processors, for example. Reference sign 700 denotes transceivers or input/output (I/O) units connected to the processor 600. The I/O units 700 may be used for communicating with other network elements or functions, such as other hierarchical levels like the VNP level (and thus the VNO level) according to FIG. 3 or FIG. 4, or with network elements or nodes forming the physical resources of the PIP/InP's network. Reference sign 800 denotes a memory usable, for example, for storing data and programs to be executed by the processor 600 and/or as a working storage of the processor 600.

The processor 600 is configured to execute processings related to the mechanisms described in connection with the first and second alternatives according to FIG. 3 or FIG. 4.

In particular, when acting in accordance with the first alternative according to FIG. 3, the processor 600 is usable for receiving and processing a request for resources for a virtual network including an indication concerning a required reliability and availability level. Furthermore, the processor 600 is usable for conducting a virtualization of resources, i.e. a transformation of physical resources into virtual resources, so as to select, isolate and reserve resources for the virtual network. In addition to this, the processor 600 is configured to perform a determination whether the resources selected and isolated fulfill the requirements for reliability and availability. Furthermore, based on the determination, the processor 600 can forward a corresponding indication to the VNP (the VNO), i.e. the confirmation or denial information.

Otherwise, when acting in accordance with the second alternative according to FIG. 4, the processor 600 is usable for receiving and processing a request for resources for a virtual network. Furthermore, the processor 600 is usable for conducting a virtualization of resources, i.e. a transformation of physical resources into virtual resources, so as to select, isolate and reserve resources for the virtual network. In addition to this, the processor 600 is configured to perform a determination of the reliability and availability level achievable by the selected resources. Moreover, the processor 600 can generate and forward a confirmation or denial regarding the request for resources, i.e. confirm the allocation of resources or indicate the fact that the requested resources can not be allocated or offered, wherein in case of a confirmation also an indication concerning the achievable reliability and availability level of selected resources is sent.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks and nodes may be any device, apparatus, unit or means by which a station, entity or other user equipment may connect to and/or utilize services offered by the access network; such services include, among others, data and/or (audio-) visual communication, data download etc.;

a user equipment or end user may be any device, apparatus, unit or means by which a system user or subscriber may experience services from an access network, such as a mobile phone, personal digital assistant PDA, or computer;

method steps likely to be implemented as software code portions and being run using a processor at a network element or node (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or nodes can be implemented as individual devices, apparatuses, units or nodes, but this does not exclude that they are implemented in a distributed fashion throughout the system, as long as the functionality of the device, apparatus, unit or node is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although the present invention has been described herein before with reference to particular embodiments thereof, the present invention is not limited thereto and various modifications can be made thereto.

The invention claimed is:

1. A system for providing resources from a physical network, provided by at least one physical network provider, to a virtual network provider, the virtual network provider assembling the resources to compose at least one virtual network for providing telecommunication services, the system comprising:
    a) a virtual network provider controller configured to
        a1) identify a need for certain resources at the virtual network provider and an availability and reliability level to be achieved; and
        a2) request resources matching the identified need from the at least one physical network provider, wherein an indication concerning the availability and reliability level to be achieved is provided with the request;
    b) a physical network provider controller configured to
        b1) conduct virtualization for creating the virtual network by:
            b1a) identifying and selecting by the at least one physical network provider resources in the physical network based on the requested resources and the indication concerning the availability and reliability level to be achieved;
            b1b) isolating the selected resources from other resources of the physical network and reserving them for exclusive use in the virtual network;
            b1c) determining an availability and reliability level of the selected resources and generating an indication for the achieved availability and reliability level; and
            b1d) attaching unique identification, address and access information to the isolated and reserved resources in order to enable exclusive accessibility in the virtual network; and
    c) report a result of the virtualization with information concerning identification, addressability and accessibility of the selected resources and the indication concerning the achieved availability and reliability level to the virtual network provider controller;
    wherein control of the resources reserved for exclusive use in the virtual network is handed over to the virtual network provider controller.

2. A method of providing resources from a physical network, provided by at least one physical network provider, to a virtual network provider, the virtual network provider assembling these resources to compose at least one virtual network for providing telecommunication services, the method which comprises the steps of:
    a) identifying a need for certain resources at the virtual network provider and an availability and reliability level to be achieved;
    b) requesting resources matching the identified need from the at least one physical network provider, wherein an indication concerning the availability and reliability level to be achieved is provided with the request;
    c) conducting virtualization for creating the virtual network by:
        c1) identifying and selecting by the at least one physical network provider resources in the physical network based on the requested resources and the indication concerning the availability and reliability level to be achieved;
        c2) isolating the selected resources from other resources of the physical network and reserving them for exclusive use in the virtual network;
        c3) determining an availability and reliability level of the selected resources and generating an indication for the achieved availability and reliability level; and c4) attaching unique identification, address and access information to the isolated and reserved resources in order to enable exclusive accessibility in the virtual network;

d) reporting a result of the virtualization with information concerning identification, addressability and accessibility of the selected resources and the indication concerning the achieved availability and reliability level; and e) handing over control of the resources reserved for exclusive use in the virtual network.

3. In a communication system, a method comprising:
sending a request for providing resources for a virtual network from a virtual network operator level or a virtual network provider level to a hierarchically lower provider level including either a virtual network provider level or an infrastructure provider level, the request comprising:
an indication regarding required availability and reliability value to be achieved by the resources of the virtual network.

4. The method according to claim 3, which further comprises:
receiving, at the virtual network operator level or the virtual network provider level from the hierarchically lower provider level, a response to the request, the response including one of:
a confirmation indicating that the required availability and reliability value is achievable by the resources of the virtual network, or a denial indicating that the required availability and reliability value is not achievable by the resources of the virtual network.

5. The method according to claim 3, wherein the indication regarding the required availability and reliability value to be achieved comprises at least one of:
a metric for the required availability of resources to be provided; and
a request for providing redundant resources including a diversity.

6. In a communication system, a method comprising:
receiving a request for providing resources for a virtual network from a virtual network provider level or a virtual network operator level at a hierarchically lower provider level including either virtual network provider level or an infrastructure provider level, the request comprising:
an indication regarding required availability and reliability value to be achieved by the resources of the virtual network; and
checking whether the required availability and reliability value is achievable for the resources to be provided for the virtual network.

7. The method according to claim 6, wherein the checking step comprises performing at least one of a calculation procedure of network paths to be provided for the virtual network or a reservation procedure of the resources.

8. The method according to claim 6, wherein the indication regarding the required availability and reliability value to be achieved comprises at least one of:
a metric for the required availability of resources to be provided; and
a request for providing redundant resources including a diversity.

9. The method according to claim 6, further comprising:
sending, at the hierarchically lower provider level to the virtual network provider level or the virtual network operator level, a response to the request, the response comprising a result of the checking indicating one of:
a confirmation indicating that the required availability and reliability value is achievable by the resources of the virtual network, or a denial indicating that the required availability and reliability value is not achievable by the resources of the virtual network.

10. In a communication system, a method comprising:
identifying at a virtual network provider a need for certain resources for a virtual network and determining an availability and reliability value to be achieved therefor, wherein the identifying includes identifying a request from a virtual network operator level or a virtual network provider level to a hierarchically lower provider level including either a virtual network provider level or an infrastructure provider level; and
requesting resources matching the identified need from at least one physical network provider, wherein the request contains:
an indication regarding a required availability and reliability value to be achieved by the resources of the virtual network.

11. The method according to claim 10, wherein the need for certain resources is identified based on a given traffic demand created by users and/or a request from a customer and/or a request from a virtual network operator, regarding a modification of an existing virtual network or a creation of a new virtual network, and wherein the availability and reliability value to be achieved is determined or derived on the basis of information provided with the traffic demand created by the users and/or a request from a customer and/or a request from a virtual network operator.

12. The method according to claim 10, further comprising receiving at the virtual network provider information on resources allocated to the virtual network, the information concerning identification, addressability and accessibility of selected resources and an indication concerning an achieved availability and reliability value thereof;
assembling a virtual network on the basis of the received information on resources; and
handing over control of the resources reserved for exclusive use in the virtual network to a virtual network operator.

13. An apparatus, comprising: a memory; and
a processor configured to generate a request for providing resources for a virtual network and to send the request from a virtual network operator level or a virtual network provider level to a hierarchically lower provider level including either a virtual network provider level or an infrastructure provider level, the request including:
an indication regarding required an availability and a reliability value to be achieved by the resources of the virtual network.

14. An apparatus, comprising: a memory; and
a processor configured to:
receive a request for providing resources for a virtual network from a virtual network provider level or a virtual network operator level at a hierarchically lower provider level including either a virtual network provider level or an infrastructure provider level and to process the request;
the request containing an indication regarding a required availability and a reliability value to be achieved by the resources of the virtual network; and check whether the required availability and reliability value is achievable for the resources to be provided for the virtual network.

15. An apparatus, comprising: a memory; and
a processor configured to:
identify at a virtual network provider a need for certain resources for a virtual network and to determine an availability and reliability value to be achieved therefor, wherein the processor identifies the need based on a request from a virtual network operator level or a virtual network provider level to a hierarchically lower provider level including either a virtual network provider level or an infrastructure provider level; and
request resources matching the identified need from at least one physical network provider, by sending a request containing:
an indication regarding required availability and reliability value to be achieved by the resources of the virtual network.

16. A method, comprising:
receiving a response at a virtual network operator level or a virtual network provider level from a hierarchically lower provider level including either a virtual network provider level or an infrastructure provider level, to a request for providing resources for a virtual network, the response containing:
an indication regarding an availability and reliability value achievable by the resources of the virtual network.

17. A method, comprising:
determining an availability and reliability value achievable for resources to be provided for a virtual network requested in a request from a virtual network provider level to a hierarchically lower provider level including an infrastructure provider level;
sending a response at the infrastructure provider level to the virtual network provider level to the request for providing the resources for the virtual network, the response containing:
an indication regarding the determined availability and reliability value achievable by the provided resources of the virtual network.

* * * * *